April 24, 1934.  J. H. BANINGER  1,956,305
BEARING MOUNTING
Filed Dec. 12, 1930
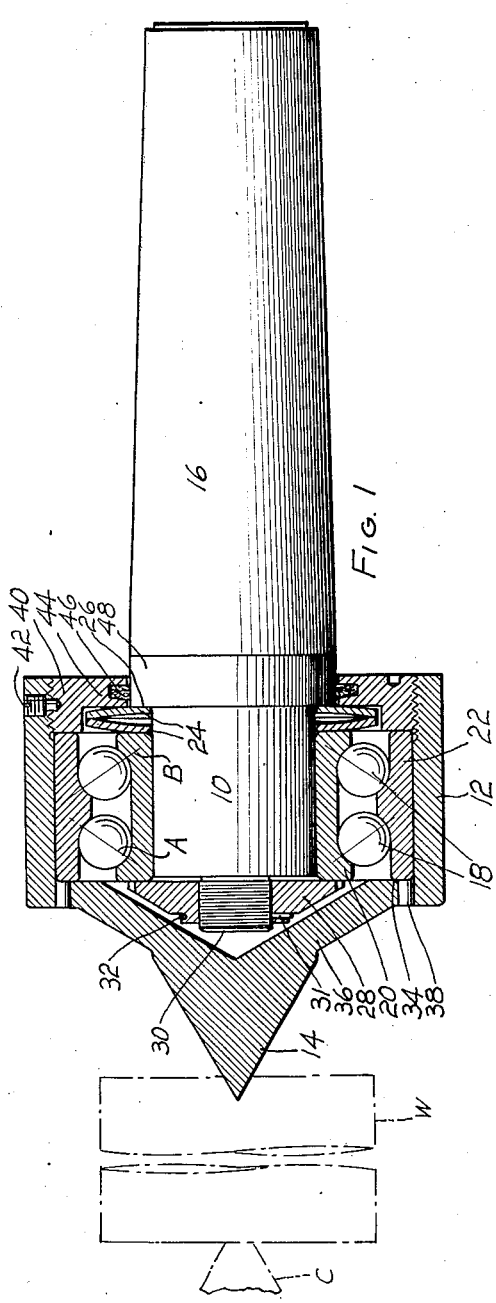
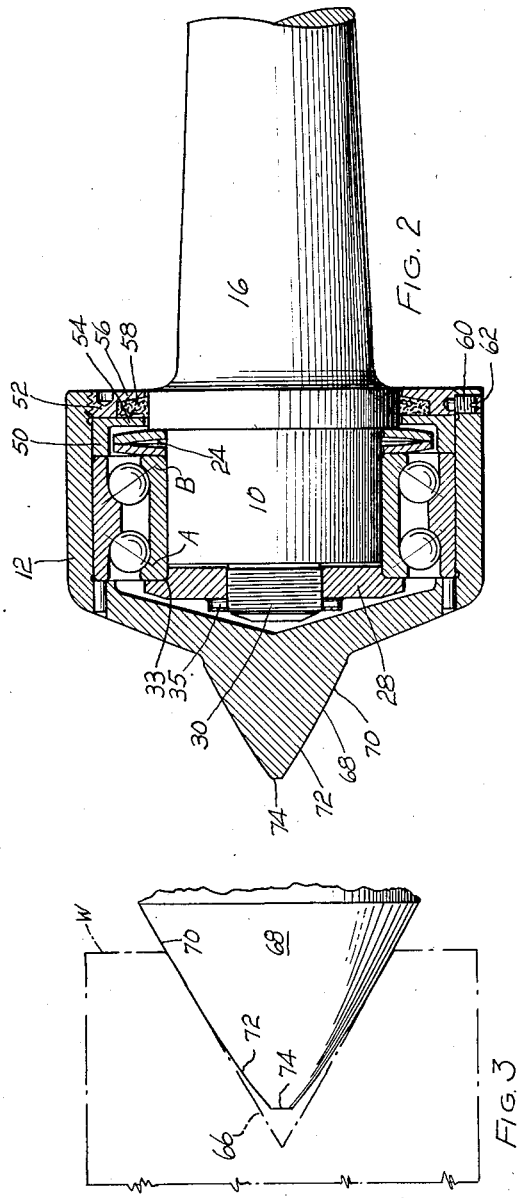
INVENTOR:
JOHN H. BANINGER,
BY
HIS ATTORNEY Patented Apr. 24, 1934

1,956,305

UNITED STATES PATENT OFFICE 1,956,305

BEARING MOUNTING

John H. Baninger, Bristol, Conn., assignor, by mesne assignments, to General Motors Corporation, Detroit, Mich., a corporation of Delaware Application December 12, 1930, Serial No. 501,854

9 Claims. (Cl. 82—33)

This invention relates to bearing mountings, being especially applicable to lathe centers, and comprises all the features of novelty herein disclosed.

An object of the invention is to provide an improved mounting for lathe centers and the like. Another object is to provide improved means to protect the bearings of a rotary lathe center from excessive end thrust while maintaining true running alignment of the center under all conditions. Another object is to provide a simple, compact and durable lathe center mounting which will compensate for work expansion and maintain accurate and firm support. Still another object is to provide an improved form of lathe center to prevent heating thereof and to insure rotation.

To these ends and to improve generally upon devices of this character, the invention further consists in the various matters hereinafter described and claimed. In its broader aspects, the invention is not necessarily limited to the specific construction selected for illustrative purposes in the accompanying drawing in which Fig. 1 is a longitudinal sectional view.

Fig. 2 is a similar view of a modification.

Fig. 3 is a diagrammatic view.

A stud 10 extends into a housing 12, one of these members, preferably the housing, having a tapered lathe center 14 projecting therefrom and the other member having a projecting shank 16 for supporting it on a tailstock or headstock. An antifriction bearing having two rows of rolling elements 18, herein shown as balls, is mounted between the stud and the housing, the inner race ring 20 having a push or tapping fit on the stud for accurate sliding thereon and the outer race ring 22 preferably having a drive fit in the housing.

The inner race ring abuts at one end against a stiff spring preferably consisting of a pair of dished plates or washers 24 which engage one another at their outer peripheries and loosely surround the stud at their inner peripheries. One of the dished spring plates abuts against a shoulder 26 where the stud joins the shank. The inner race ring 20 projects a little beyond the stud 10 where it is engaged by a stop member, preferably an adjusting nut 28 screwed on a threaded projection 30 of the stud. The nut is locked in position by a radial projection 31 from an arcuate spring 32 supported in a groove of the nut. The outer race ring abuts against an annular face 34 on an end wall 36 of the housing and extends nearly to the open end of the housing. The end wall 36 is internally conical and the nut is slabbed off to allow a close approach of this wall to the stud so that the overall length of the housing can be kept down. The end wall has one or more axial openings with removable pins or plugs 38 to provide for driving the outer race ring from the housing.

The housing is closed by a ring nut 40 threaded therein and fastened in abutting relation to the outer race ring by a screw 42. The nut has an extension 44 provided with a channel for a sealing washer 46 which runs on a smooth surface 48 of the shank 16 to retain lubricant and exclude grit. The extension of the nut also forms a recess which receives and houses the spring plates 24. The antifriction bearing is shown as a double row ball bearing with one-piece race rings wherein the angular contact load lines A and B diverge towards the axis of rotation of the lathe center. The rolling elements are put under an initial predetermined compression or internal load in the direction of these load lines when the bearing is assembled so that, when external axial load is applied to the taper center 14, (as by the work-piece W and opposed taper center C) the load along the line A is not entirely removed. Consequently both rows of balls always have contact with their raceways and prevent any radial or axial looseness which could result in play or chatter of the lathe center. The divergent relation of the load lines gives a bracing effect tending to prevent cocking or tilting of the housing with respect to the stud and produces an accurate and stable support. The center 14 is conveniently ground while its housing is rotated on the bearing to insure concentricity of center and axis of rotation.

The nut 28 holds the inner race ring in such an adjusted position on the stud that the spring afforded by the opposed plates 24 is under a heavy initial compression. This load is made so great that the spring device will not give when a normal working end thrust is applied to the taper center. However, should the load become greater than normal, as by excessive expansion of the work due to heating, the spring device will give and allow the bearing to shift bodily with its housing along the stud. When the excess of load is removed, the spring moves the bearing and the taper center back again until the inner race ring again forcibly engages its stop nut 28. The spring does not increase the load on the bearing elements at any time but, under severe conditions, it acts as a cushion or compensator to prevent excessive thrust load on one row of balls and so maintains the other row loaded to promote true running under all conditions.

In Fig. 2, the inner race ring overhangs a shorter and larger stud 10 and fits in an annular notch 33 of the nut 28 whose threads loosely fit the large threaded stud 30. The nut can thus square itself with the end of the race ring and support the bore. The nut is fastened by a taper pin 35 passed radially through registering holes in stud and nut. The inner race ring is of larger diameter than in Fig. 1, thus using smaller rolling elements but taking more of them. The race ring is also narrower than in Fig. 1 but the two rows of smaller rolling elements do not need as thick thrust shoulders at the sides and can be given greater spacing or clearance between the rows thus sacrificing none of the bracing effect of divergence in angular contact load lines A and B. The above factors and a rounded center to be described, aid in decreasing the overall length of the housing. The end of the outer race ring is held by a sleeve 50 fitting the bore of the housing 12 and locked by a ring nut 52. The sleeve has a flange 54 and the ring nut has a tapered flange 56, the two flanges forming a recess for a felt sealing washer 58. The felt can be assembled axially in the ring nut, and the tapering flange 56 crowds the felt to a shape which will produce a capillary effect tending to exclude foreign matter. A screw plug 60, having an extension entering a selected hole in the ring nut, locks the latter in clamping position. A seal 62 of lead or the like is run in over the plug so that any tampering with the mounting (or exposure of the bearings to grit after final assembly by the maker) will be apparent and provide reasonable excuse for refusing replacement.

An important feature of the invention resides in the shape of the centering member which is shown longitudinally crowned or convex. The standard conical recess in work to be turned has an included angle of 60° as indicated at 66 in Fig. 3. When a 60° conical lathe center enters such a recess, it is more apt to engage near the point, especially if any foreign matter gets in the recess. The work then turns on the point or near it and (assuming a non-rotary center) this localizes frictional heating and burns the point or the work. Another consequence of this point engagement (in case the center is intended to rotate, as on antifriction bearings) is that the work will turn and not the center, due to the lack of a sufficient turning moment. Accordingly, I insure a sufficient turning moment by rounding off the nose portion longitudinally of the center to produce a surface of revolution which is spaced (in part at least) from the cone defined by the recess. The work then bears at a location remote from the axis of the center and the center will rotate with the work. In the present embodiment, the centering member 68 has its portion 70 nearest the housing or other carrier member of frusto-conical shape while the remaining portion 72 merges smoothly with it but gradually fades away from the conical recess 66 to the blunt end 74. The work then frictionally engages the center well up from the point and the large turning moment around the axis insures rotation of the carrier member on the bearings. The pointed end however is still available for guiding the work onto the center and for holding small work. The overall length of the housing, including the center, is materially reduced over that of Fig. 1, both by the rounded nose or center and by the shorter stud 10.

This application is a continuation in part of my application Serial Number 453,924, filed May 20, 1930.

I claim:

1. In a device of the character described, a rotary carrier member having a pointed lathe center projecting therefrom, a supporting member, a bearing between said members to provide for rotation of the lathe center, the lathe center having a conical work-engaging surface remote from the point and an integral continuation comprising a second work-engaging surface longitudinally rounded from said conical surface to the point and gradually departing from such conical surface to thereby occupy a space smaller than the omitted apex end of said conical surface; substantially as described.

2. A pointed lathe center comprising a one-piece member having two tapered work-engaging portions, each forming an integral continuation of the other and presenting two surfaces of revolution merging smoothly one with the other, one surface being substantially conical, and the merging surface being longitudinally rounded to the point and departing gradually from a continuation of the conical surface and so enclosing a space smaller than that included in the surrounding portion of the conical recess of a work-piece held by said lathe center; substantially as described.

3. A pointed lathe center comprising a one-piece member having two work-engaging portions, each forming an integral continuation of the other and presenting two surfaces of revolution merging smoothly one with the other and each surface adapted to enter a lathe center recess in a piece of work, one surface being substantially conical, the merging surface being longitudinally rounded to the point and enclosing a space smaller than that included in the surrounding portion of the conical recess of a work-piece held by said lathe center, and means for mounting said two work-engaging portions for free rotation around an axis; substantially as described.

4. In a device of the character described, a pointed lathe center having a longitudinally rounded work engaging portion extending outwardly from the point and gradually approaching and merging with a conical work-engaging portion, whereby, for both large and small conically-recessed work, contact of the center with such work occurs only a distance from the axis of the center; substantially as described.

5. In a device of the character described, a tapered lathe center comprising a pointed member having a continuous work-engaging surface extending outwardly from the point, such surface increasing in diameter from the point and more and more slowly approaching and merging with the surface of a cone; substantially as described.

6. In a device of the character described, a lathe center comprising a pointed member having a continuous, tapering work-engaging surface extending outwardly from the point, the portion more remote from the point having a taper adapted to fit the conically recessed end of a large work-piece, the remaining portion of the work-engaging surface having a gradually decreasing taper to the point to thereby clear the large work-piece completely and to engage small work-pieces at maximum distance from the axis thereof; substantially as described.

7. In a device of the character described, a carrier member, a supporting member, a bearing between said members to provide for rotation of the carrier member, the carrier member having an end wall with a pointed lathe center projecting from it, the outer portion of the center being substantially conical and the remaining portion being longitudinally rounded to the point and becoming slightly smaller than a continuation of the conical surface, and both said portions constituting work-engaging surfaces for large and small work; substantially as described.

8. In a device of the character described, a housing, a stud extending into the housing, rolling elements, an inner race ring supported by the stud and an outer race ring supported by the housing, the inner race ring overhanging the stud, the stud having a threaded projection, and a nut on said projection and having a notch receiving the overhanging portion of the inner race ring; substantially as described.

9. In a lathe center, a housing, a stud extending into the housing, rolling elements, an inner race ring supported by the stud and an outer race ring supported by the housing, a sleeve entering the housing and having a flange extending towards the stud, a nut secured to the housing and having a tapering flange opposed to said sleeve flange, and a sealing washer between said flanges; substantially as described.

JOHN H. BANINGER.